(12) United States Patent
Nakanishi (10) Patent No.: US 7,036,775 B2
(45) Date of Patent: May 2, 2006

(54) FASTENER FOR PIPE OR THE LIKE

(75) Inventor: Hideaki Nakanishi, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/467,972

(22) PCT Filed: Feb. 8, 2002

(86) PCT No.: PCT/US02/03543

§ 371 (c)(1),
(2), (4) Date: Feb. 3, 2004

(87) PCT Pub. No.: WO02/065009

PCT Pub. Date: Aug. 22, 2002

(65) Prior Publication Data

US 2004/0113027 A1 Jun. 17, 2004

(30) Foreign Application Priority Data

Feb. 14, 2001 (JP) ............................. 2001-037098

(51) Int. Cl.
*F16L 3/22* (2006.01)
(52) U.S. Cl. .................... 248/68.1; 248/73; 248/74.2
(58) Field of Classification Search .............. 248/68.1, 248/71, 73, 74.2, 62, 65, 67.7, 634, 74.1, 248/49

See application file for complete search history.

(56) References Cited

U.S. PATENT DOCUMENTS

| 5,002,243 | A | * | 3/1991 | Kraus et al. | ................ 248/68.1 |
| 5,209,441 | A | | 5/1993 | Satoh | |
| 5,460,342 | A | * | 10/1995 | Dore et al. | ................. 248/74.2 |
| 5,588,683 | A | * | 12/1996 | Schliessner | ................... 285/62 |
| 5,947,426 | A | * | 9/1999 | Kraus | ........................ 248/74.2 |
| 5,954,300 | A | * | 9/1999 | Sturies et al. | .............. 248/68.1 |
| 6,089,513 | A | * | 7/2000 | Cau et al. | ................... 248/68.1 |
| 6,152,406 | A | * | 11/2000 | Denndou | ................... 248/68.1 |
| 6,241,198 | B1 | * | 6/2001 | Maruyama | .................... 248/49 |
| 6,450,459 | B1 | * | 9/2002 | Nakanishi | .................. 248/68.1 |
| 6,585,196 | B1 | * | 7/2003 | Nakanishi | .................. 248/68.1 |
| 6,779,763 | B1 | * | 8/2004 | Miura et al. | ................... 248/71 |

FOREIGN PATENT DOCUMENTS

| DE | 299 11 639 U1 | 9/1999 |
| EP | 0 569 297 A1 | 11/1993 |
| EP | 0 666 628 A1 | 8/1995 |

(Continued)

*Primary Examiner*—Korie Chan
(74) *Attorney, Agent, or Firm*—Harness, Dickey & Pierce, P.L.C.

(57) ABSTRACT

A fastener (21) for a pipe or the like, comprising a base (22) and a pipe holder portion (23–26) supported by the base. The pipe holder portion includes a wall (30, 31) defining a recess for receiving a pipe or the like therein, and a resilient holding finger (34) extending obliquely from the vicinity of the end of the wall into the recess. The pipe holder portion is supportedly connected to the base (22) through a hollow tubular cushion portion (41). The end of the wall of the pipe holder portion is connected, through a short sheet-like thin connecting piece (43), to either an adjacent wall of another pipe holder portion or an adjacent wall integrated with the base. The thin connecting piece (43) is formed in a thin plate having the same length as that of the pipe holder portion in the longitudinal direction of the pipe. The thin connecting piece is formed with a slit (45) extending in the longitudinal direction of the pipe.

14 Claims, 9 Drawing Sheets

FOREIGN PATENT DOCUMENTS

JP  08210560 A  *  8/1996

* cited by examiner

FASTENER FOR PIPE OR THE LIKE

FIELD OF THE INVENTION

The present invention relates to a fastener for holding an elongated component such as a pipe or wire harness to a member such as an automobile body.

BACKGROUND OF THE INVENTION

In a support structure for attaching an elongated component such as a fuel pipe, brake pipe or wire harness of an automobile, it is desired to have vibration absorbability for preventing vibration of an automobile body from transmitting to the above pipe or the like. Heretofore, for the purpose of such vibration insulation, a technique of attaching the pipe or the like to a fastener with winding a rubber vibration insulator around the pipe or the like has been typically employed. In view of a poor workability of this technique, it is desired to provide a vibration insulation function to the fastener itself. From this point of view, Japanese Patent Laid-Open No. 07-310866 discloses a clip fastener suitable for holding a fuel pipe, in which a pipe holder portion is connected to a support through a hollow portion. This clip is intended for supporting an elongated component such as a pipe, and designed to prevent vibration transmission from the pipe or the like to an automobile body or the like (or vibration transmission from the automobile body to the pipe or the like) as much as possible. In the disclosed clip fastener for a pipe or the like, a structure having four pipe holder portions arranged in line is disclosed as an embodiment. However, a significant difference in vibration insulation characteristics can be caused between the line center and the line ends of the pipe holder portion.

Figure 1:
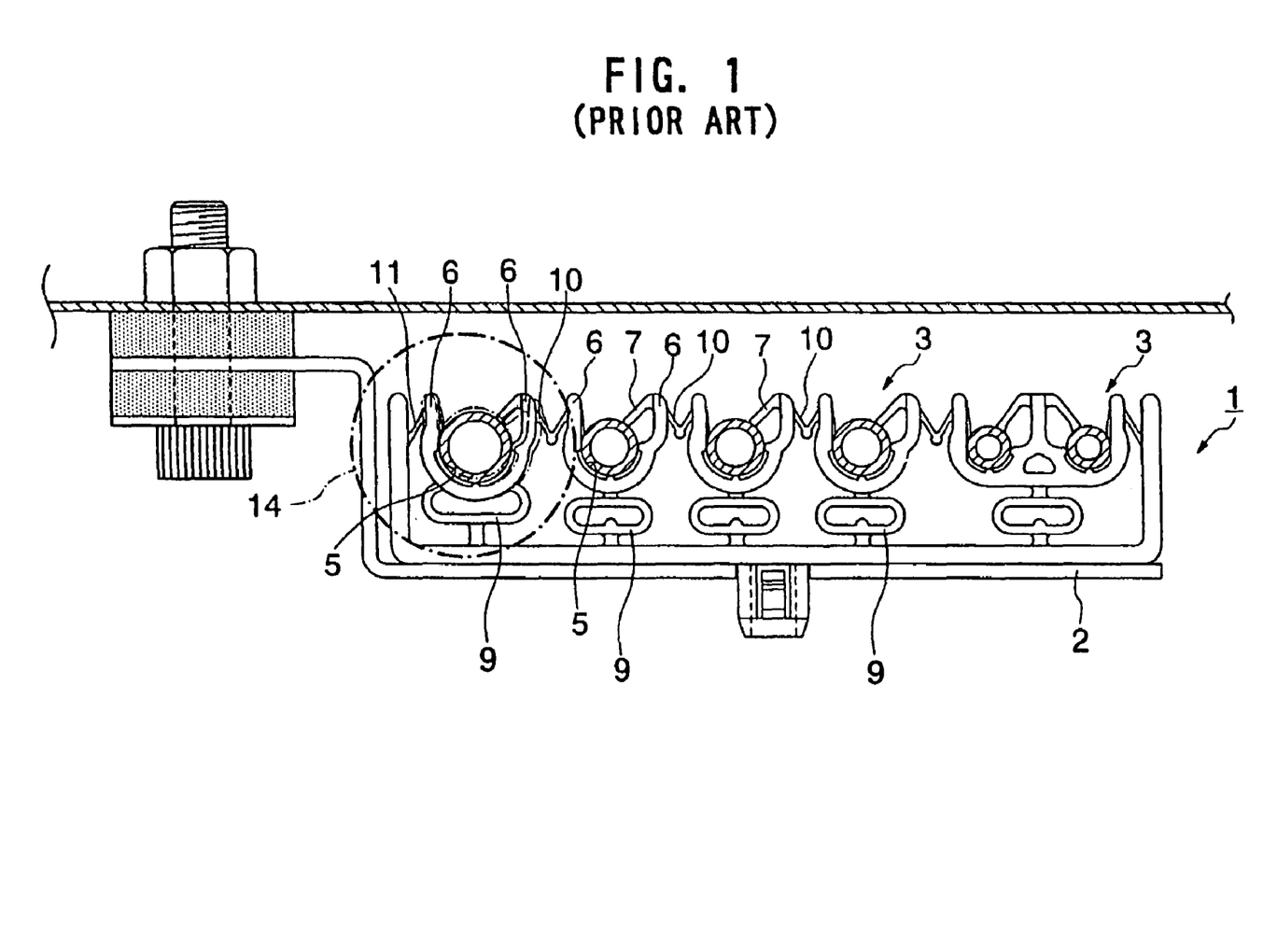
FIG. 1 is a front view of the state when a conventional pipe fastener (Japanese Patent Laid-Open No. 2000-18433) is used.
Figure 2:
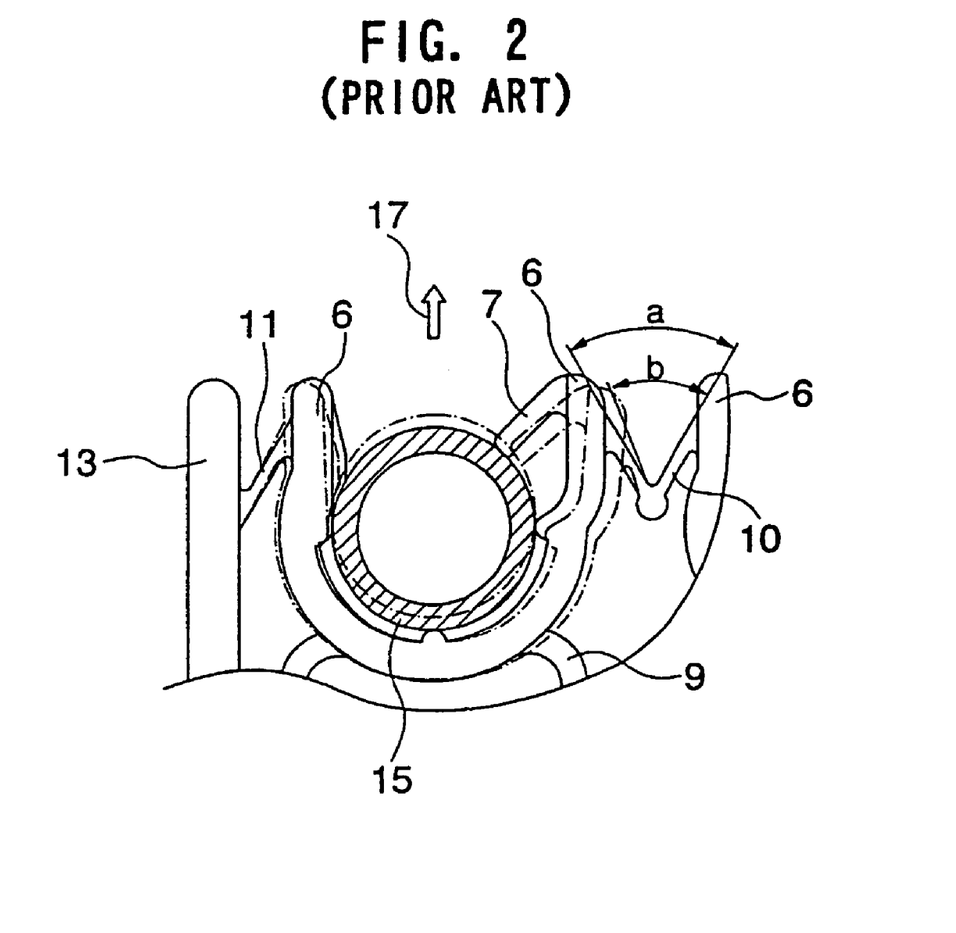
FIG. 2 is an enlarged view of a portion designated by the circle 14 of FIG. 1.

Japanese Patent Laid-Open No. 2000-18433 discloses a fastener for a pipe or the like, which has an improvement in the above point. FIGS. 1 and 2 show this fastener. In FIG. 1, the fastener 1 comprising a base 2 and a pipe holder portion 3 supported by the base 2. The pipe holder portion 3 includes a curved wall 6 defining a recess 5 for receiving an elongated component such as a pipe therein, and a resilient holding finger 7 extending obliquely from the end of the curved wall 6 into the recess. The pipe holder portion 3 is supportedly connected to the base 2 through a hollow tubular cushion portion 9. The fastener 1 provides excellent vibration insulation characteristics between the base 2 and the pipe holder portion 3. Further, even if a plurality of retaining portions 3 are arranged in line, the fastener 1 desirably provides unnoticeably suppressed difference in vibration insulation characteristics between the respective retaining portions 3.

As shown in FIGS. 1 and 2, in the fastener disclosed in the aforementioned Japanese Patent Laid-Open Publication No. 2000-18433, the end of the curved wall 6 of the pipe holder portion 3 is connected to the end of the adjacent curved wall 6 of another pipe holder portion 3 through a flexible V-shaped thin connecting piece 10. The end of the curved wall 6 of the pipe holder portion 3 is also connected to the end of the adjacent wall 13 of the base through a flexible thin connecting piece 11 arranged obliquely. While these flexible thin connecting pieces 10 and 11 were desirable in terms of vibration insulation, it was found that there was the need to be improved in a fastening force of the pipe holder portion 3. This will be explained with reference to FIG. 2 showing the portion designated by the circle 14 in FIG. 1. In FIG. 2, when a force of pushing out a pipe in the direction of the arrow 17 is applied to a pipe 15 held by the pipe holder portion 3, the thin connecting piece 10 is, for example, deformed from the angle "a" to the angle "b" in FIG. 2 because the thin connecting pieces 10 and 11 are flexible. Then, the curved wall 6 at the right side of FIG. 2 is deformed rightward. Simultaneously, the thin connecting piece 11 is also deformed slightly, and thereby the curved wall 6 adjacent to the wall 13 is deformed leftward. As a result, the inlet of the curved wall 6 is widely opened, and the resilient holding finger 7 is displaced rightward with respect to the pipe 15. Thus, it was found that the pipe 15 could be pulled out of the pipe holder portion 3 due to insufficiently degraded engagement force of the pipe 15.

It is therefore an object of the present invention to provide a fastener for holding an elongated component such as a pipe to an attachment member such as an automobile body, capable of maintaining a fastening force of the elongated component such as a pipe at high levels while maintaining insulating characteristics against vibration transmitted from the pipe or the like to an automobile body or vice versa at high levels.

SUMMARY OF THE INVENTION

In order to achieve the above object, the present invention provides a fastener for a pipe or the like, comprising a base and a pipe holder portion supported by the base. The pipe holder portion includes a wall defining a recess for receiving an elongated component such as a pipe therein, and a resilient holding finger extending obliquely from the end of the wall or the vicinity thereof into the recess. The pipe holder portion is supportedly connected to the base through a hollow tubular cushion portion. Further, the end of the wall of the pipe holder portion is connected to either an adjacent wall of another pipe holder portion or an adjacent wall integrated with the base through a sheet-like thin connecting piece. As above, since the pipe holder portion is connected to the base through the tubular cushion portion and the thin connection piece, vibration insulation characteristics between the pipe holder portion and the base can be maintained in high levels. Further, the end of the wall is connected to the adjacent wall (or the wall of the base) through the short sheet-like thin connecting piece. Thus, even if a pushing-out force is applied to a held pipe to force the wall to be deformed in the direction causing the inlet to be opened, the thin connecting piece strains to resist the deformation. This prevents the wall from being deformed and allows the fastening force of the pipe to be maintained in high levels.

In a preferred embodiment of the present invention, a base of a fastener for a pipe or the like includes an elongated bottom portion and an upright portion extending perpendicularly from the opposite ends of the bottom portion, and a plurality of pipe holder portions are supported by the base to be arranged each other with a certain distance therebetween in the longitudinal direction of the base. Each of the pipe holder portions includes a wall defining a recess for receiving an elongated component such as a pipe therein, and a resilient holding finger extending obliquely from the end of the wall or the vicinity thereof into the recess. Each of the pipe holder portions is supportedly connected to the base through a hollow tubular cushion portion. Further, in the pipe holder portion adjacent to the upright portion of the base among the pipe holder portions, the end of the wall adjacent to the upright portion is connected to the upright portion by a short sheet-like thin connecting piece, and the opposite end of the wall is connected to the end of the wall of the adjacent pipe holder portion by a short sheet-like thin connecting piece.

In the aforementioned fasteners for a pipe or the like, the thin connecting piece may be formed in a thin plate having the same length as that of the pipe holder portion in the longitudinal direction of the elongated component to be attached to the recess, and the thin connecting piece may be formed with a slit extending in the longitudinal direction of the component. This provides an improved, enhanced vibration insulation characteristics. The bottom portion of the base may be provided on the opposite side of the pipe holder side with a coupling leg to be coupled with an attachment member. This allows an elongated component such as a pipe to be attached to an attachment member such as an automobile body. In addition, the base may be formed with an attaching portion to be attached to an anchor member such as a stud fixed to an attachment member. This allows an elongated component such as a pipe to be attached to an attachment member such as an automobile body.

DETAILED DESCRIPTION OF THE PREFERRED EMBODIMENT

Figure 3:
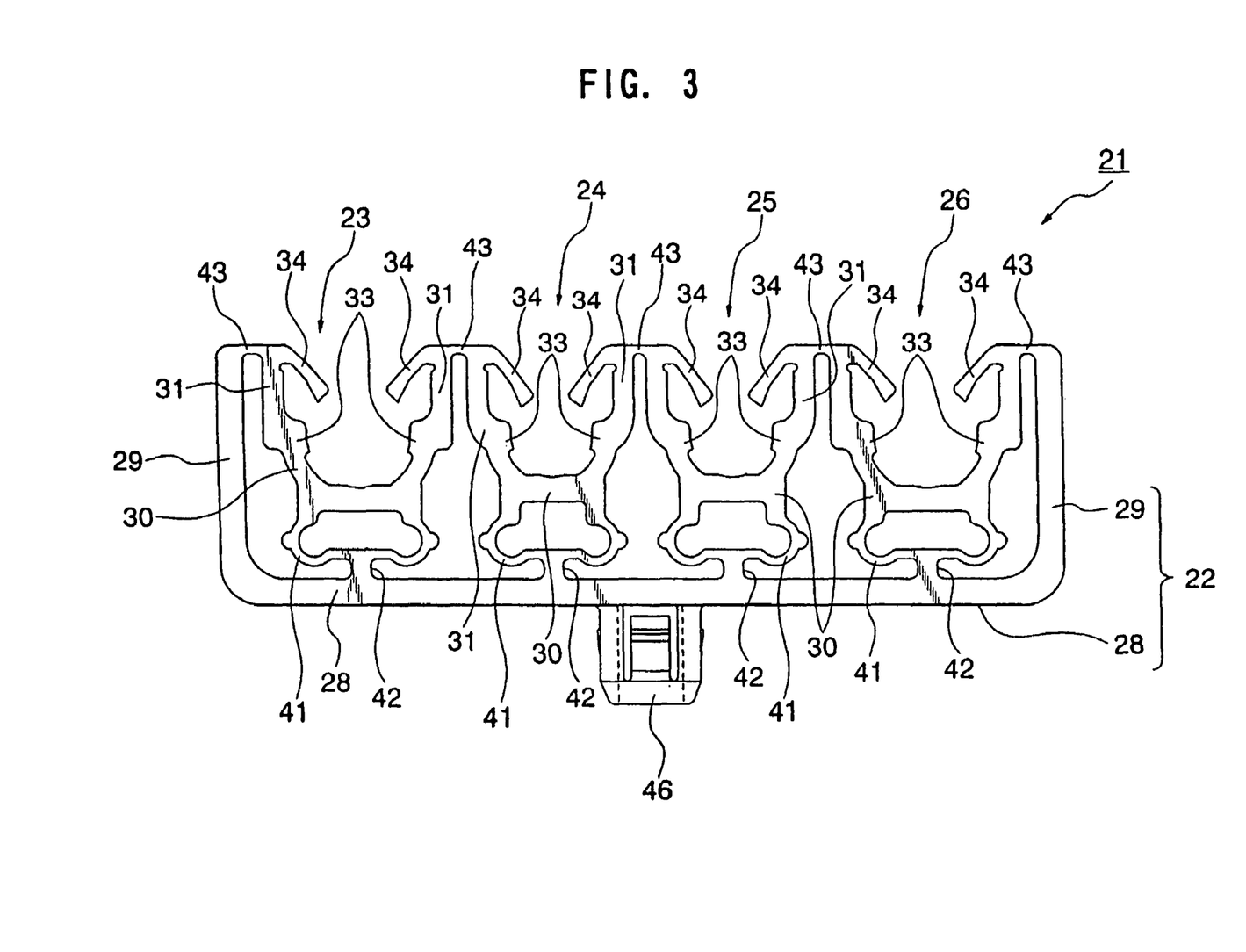
FIG. 3 is a front view of a fastener for a pipe or the like according to the present invention.
Figure 4:
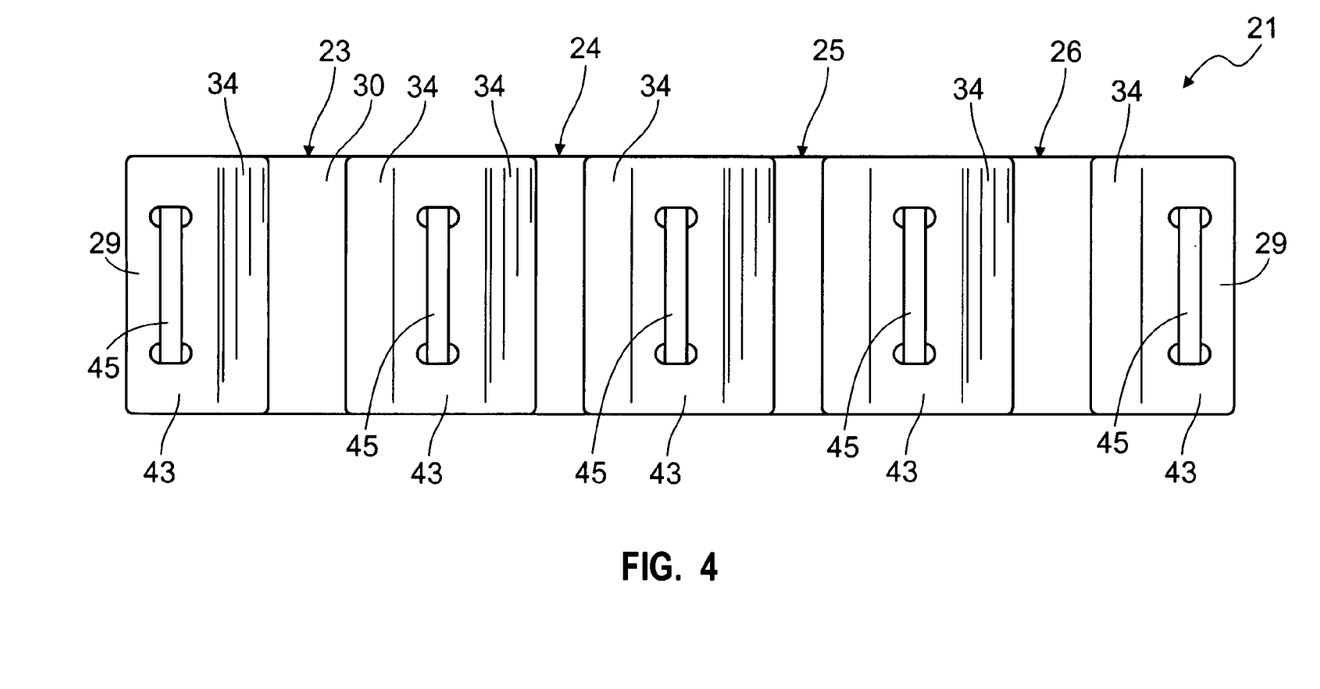
FIG. 4 is a plan view of the fastener of FIG. 3.
Figure 5:
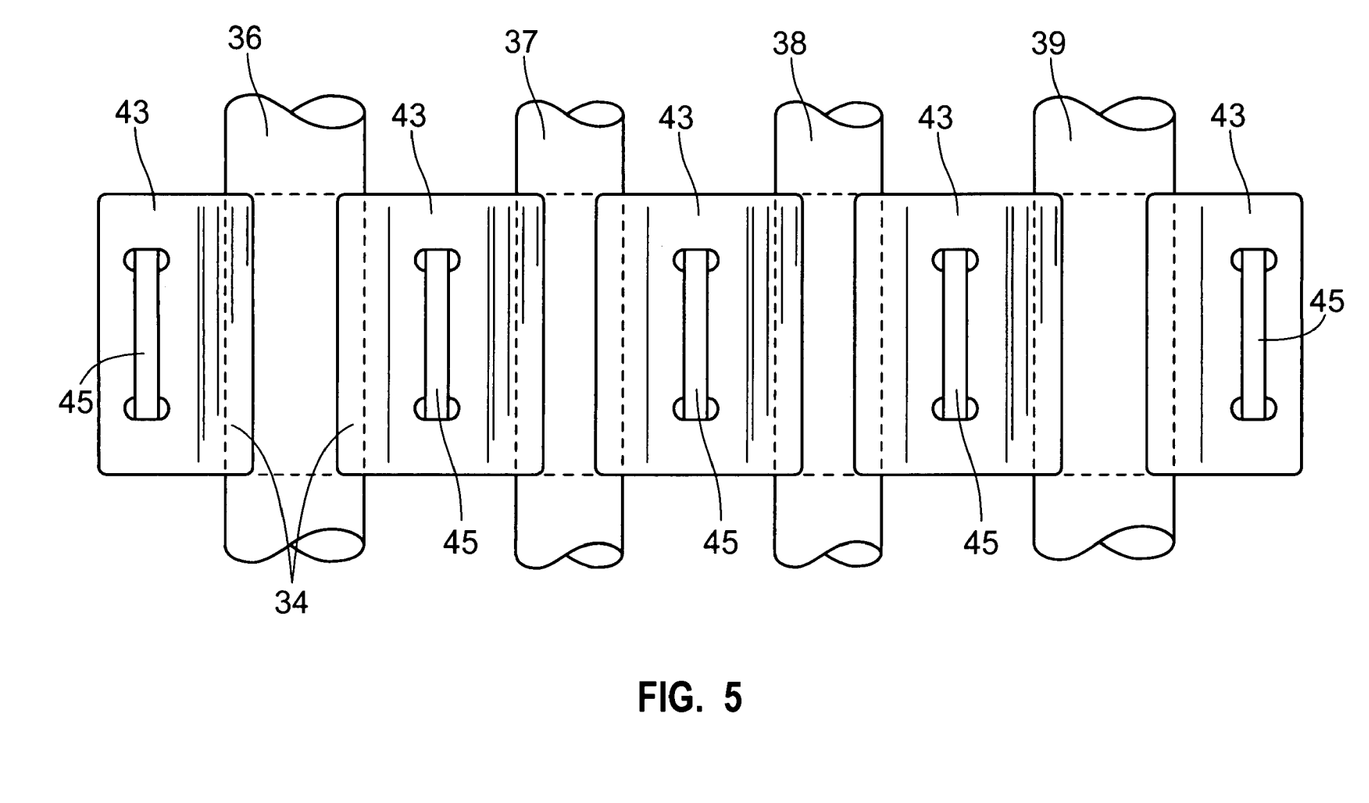
FIG. 5 is a plan view of the fastener showing the state when a pipe is held by the pipe fastener according to the present invention.
Figure 6:
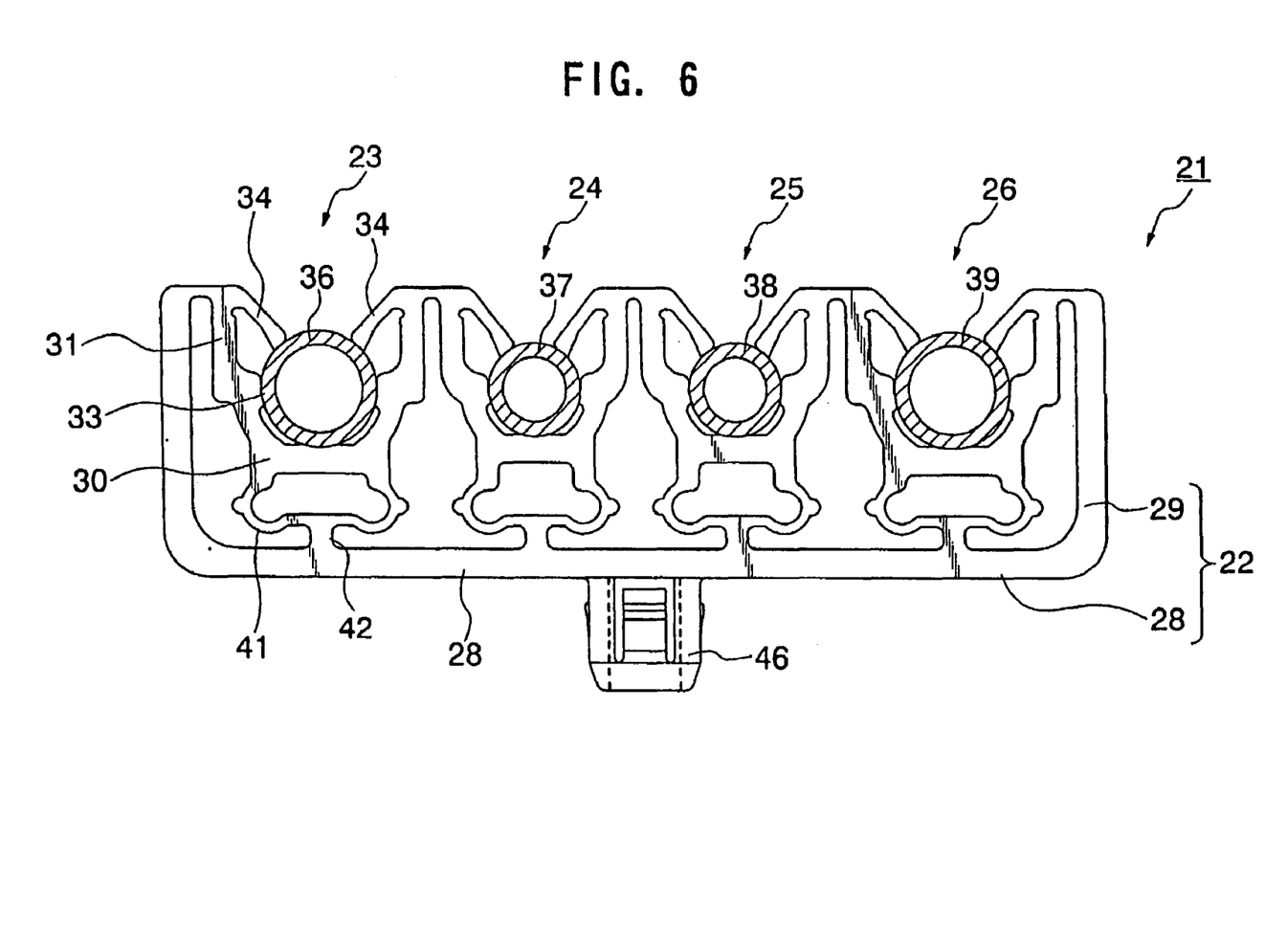
FIG. 6 is a front view of the fastener of FIG. 5.
Figure 7:
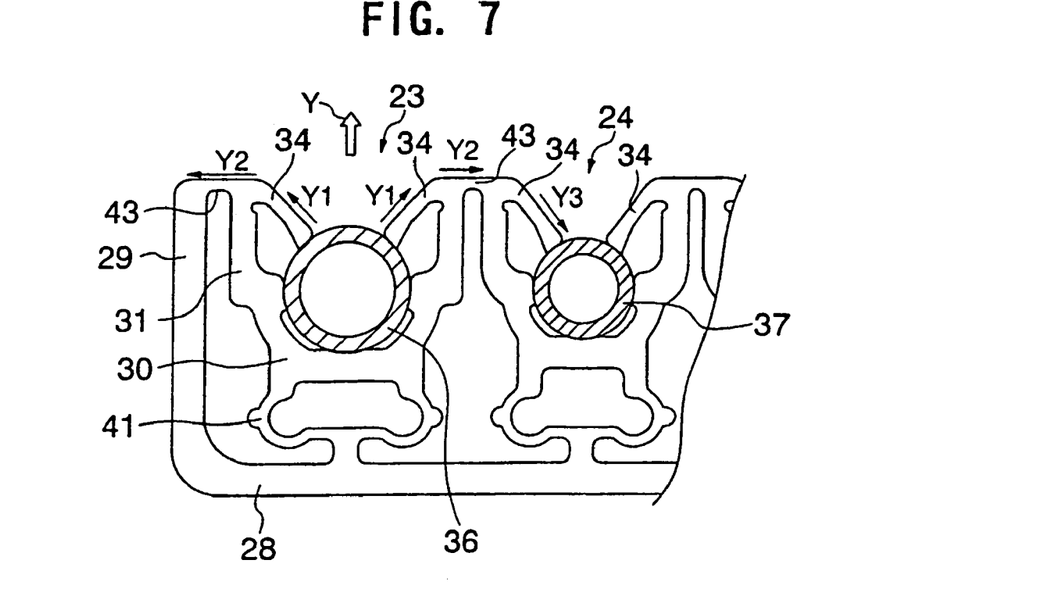
FIG. 7 is an enlarged explanatory view illustrating the left side potion of FIG. 6 and showing the relationship of forces caused when pulling-out force is applied to a single pipe.
Figure 8:
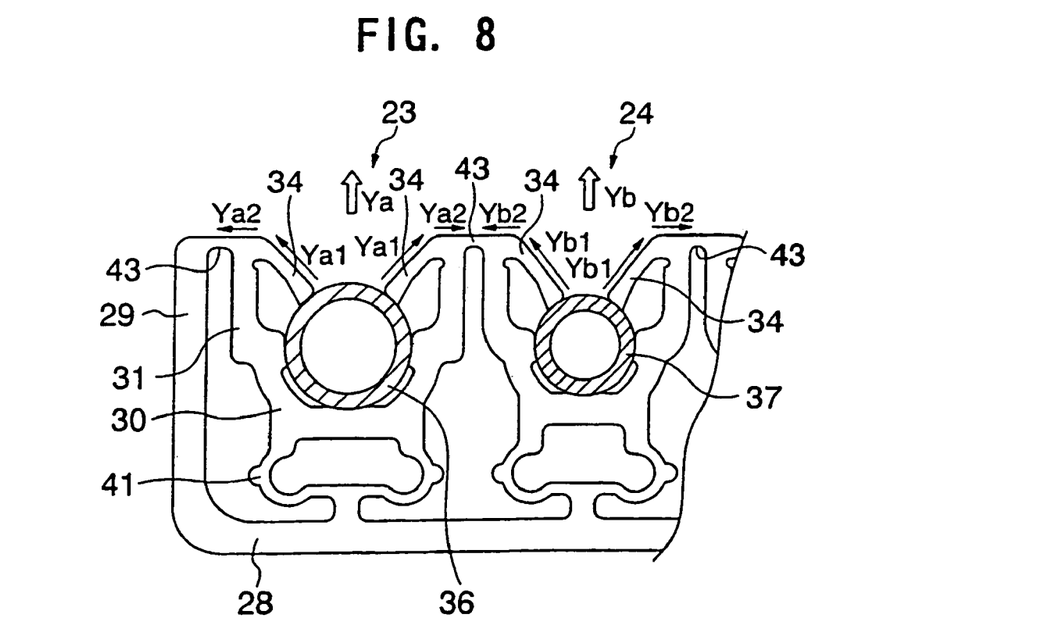
FIG. 8 is an enlarged explanatory view illustrating to the left side portion of FIG. 6 and showing the relationship of forces caused when pulling-out force is applied to two adjacent pipes, simultaneously.
Figure 9:
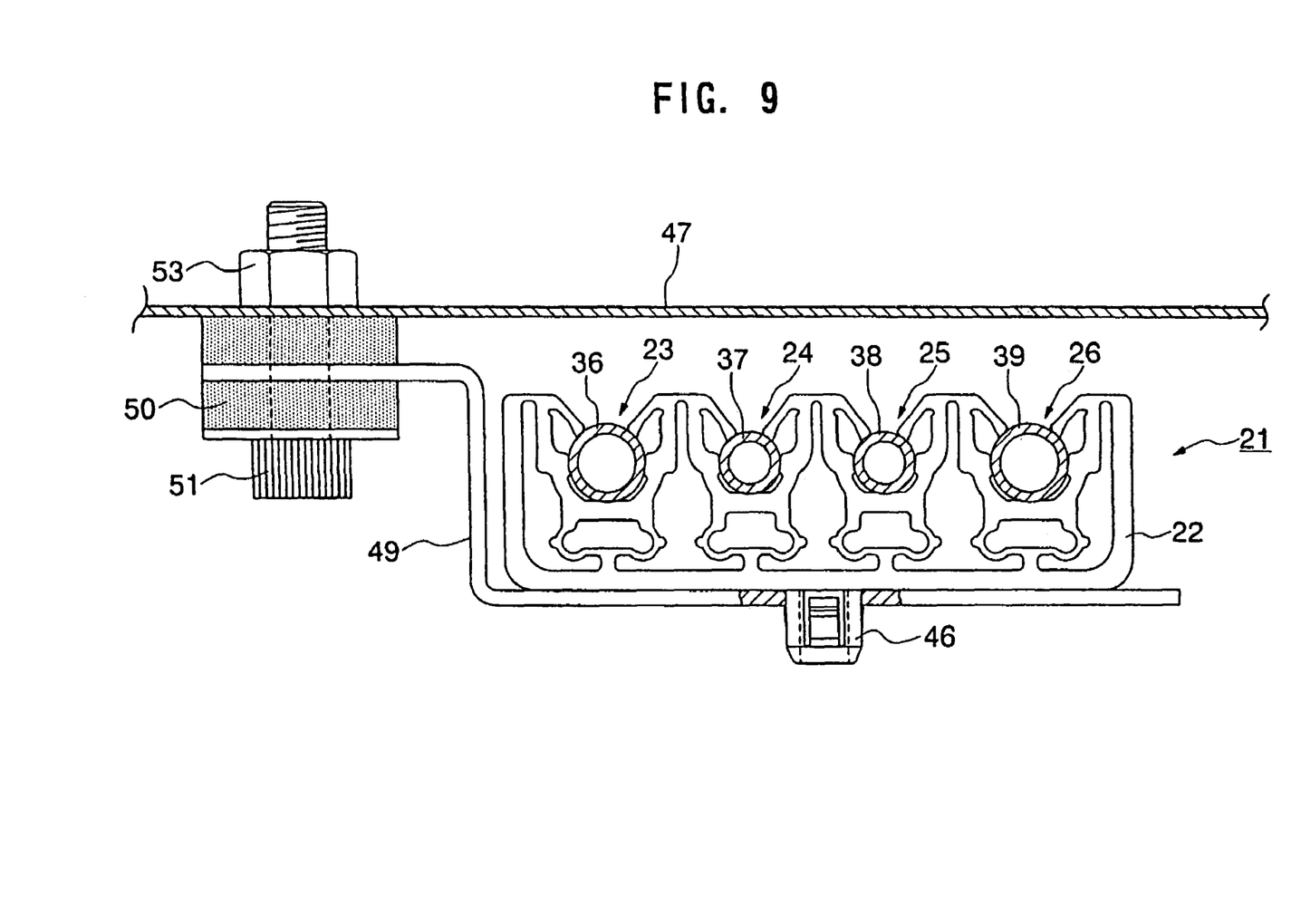
FIG. 9 is a front view showing a fastener for pipe or the like according to one embodiment of the present invention, in which the fastener is attached to an automobile body.
Figure 10:
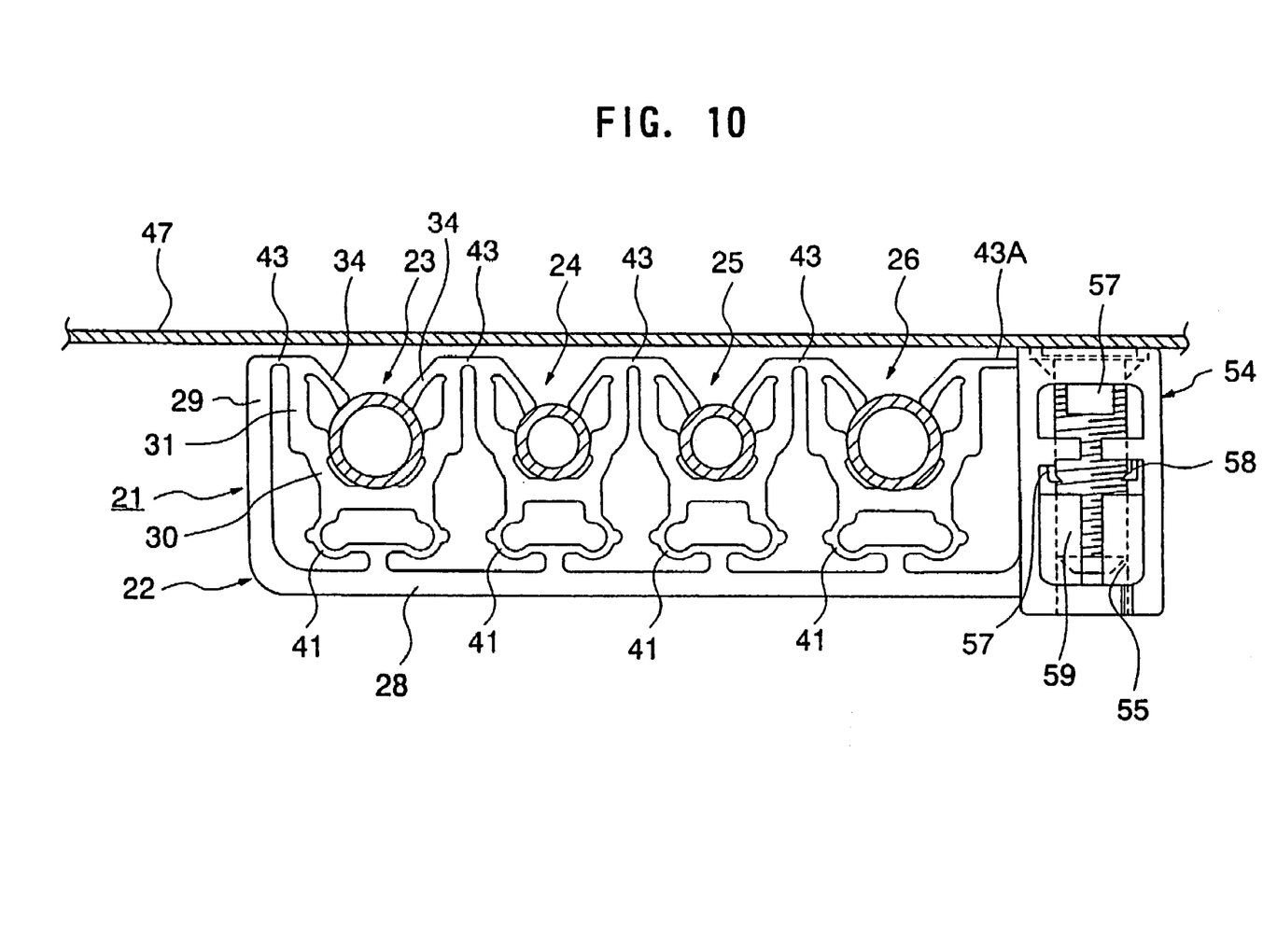
FIG. 10 is a front view showing a fastener for pipe or the like according to another embodiment of the present invention, in which the fastener is attached to an automobile body.

With reference to the drawings, an embodiment of the present invention will now be described. FIGS. 3 and 4 show a construction of a fastener 21 for a pipe or the like according to the present invention. FIGS. 5 and 6 show the fastener 21 in the state when pipes are held thereby. FIGS. 7 and 8 illustrate a fastening force of a pipe in the fastener 21. FIGS. 9 and 10 show an example of attaching a pipe as an elongated component to an automobile body as an attachment member by using the fastener 21. The fastener 21 according to the present invention is an integrally formed product made of a plastic material. As shown in FIGS. 3 and 4, the fastener 21 comprises a base 22 and a plurality (four in the illustrated embodiment) of pipe holder portions 23-26 supported by the base 22. The base 22 includes an elongated bottom portion 28 and upright portions 29 extending perpendicularly from opposite ends of the bottom portion 28. The pipe holder portions 23–26 are aligned in the longitudinal direction of the elongated bottom portion 28 of the base 22. Each of the outer pipe holder portions 23 and 26 is formed to hold a larger-diameter pipe, and each of the inner pipe holder portions 24 and 25 is formed to hold a smaller-diameter pipe.

In FIG. 3, each of the pipe holder portions 23–26 includes a main holder portion 30 forming a bottom wall having an approximately semicircular section and an upright wall 31 extending perpendicularly upward from each of the edges of the main holder portion 30, and defines therein a recess for receiving or housing an elongated component such as a pipe or the like. An inward holding-protrusion 33 is formed at each of the inner sides of two boundaries between the main holder portion 30 and the upright walls 31. At each outer end of the upright walls 31 is formed with a resilient holding finger 34 extending obliquely inward. As shown in FIG. 6, each of the pipes 36–39 is received in the corresponding one of the pipe holder portions 23–26 to allow the lower and both lateral sides of each outer peripheral surface of the pipes to be brought into contact with the central upper surface and the protrusions 33 of the corresponding main holder portion 30, respectively. Further, the upper side of each outer peripheral surface of the pipes is pushed downward by the two resilient holding fingers 34 to allow each of the pipes to be held by the corresponding one of the pipe holder portions 23–26.

Further, a hollow tubular cushion portion 41 is formed on the outer and lower surface of the main holder portion 30 of each of the pipe holder portions 23–26. The lower surface of the cushion portion 41 is connected to the bottom portion 28 of the base 22 through a support post 42. In this manner, each of the pipe holder portions 23–26 is supported by the base 22 through the hollow tubular cushion portion 41. Thus, the cushion portion 41 brings out a cushioning action against vertical vibrations, and substantially no vibration of the pipe is transmitted from the cushion portion 41 to the base 22. Thus, the cushion portion 41 can acts as vibration insulation means.

As best shown in FIGS. 3 and 4, the adjacent two pipe holder portions 23 and 24, 24 and 25, 25 and 26 are connected with each other at the adjacent ends of their upright walls through a short sheet-like thin connecting piece 43. The thin connecting piece 43 is formed in a plate configuration, and is hardly deformed. Further, the pipe holder portion 23 and the upright portion 29 (i.e. the wall) of the base 22 adjacent to this pipe holder portion 23 are connected with each other through the short sheet-like thin connecting piece 43. In the same manner, the pipe holder portion 26 and the upright portion 29 adjacent to this pipe holder portion 26 are connected with each other through the short sheet-like thin connecting piece 43. Each of the sheet-like thin connecting pieces 43 is formed in a thin plate having the same length as that of the pipe holder portion in the longitudinal direction of the pipe. As above, the connecting piece 43 is formed to have a thin thickness. This reduces lateral vibration transmission between the adjacent pipe holder portions and another lateral vibration transmission between the upright portion 29 of the base 22 and the pipe holder portion 23 or 26. The thin connecting piece 43 can sufficiently resist against a pulling-out force applied from both ends of the thin connecting piece 43, and can strain against a pushing force applied in the opposite direction without any bending to resist against any pressing forces. Thus, even if a pulling-out force is applied to the pipe to create a force which deforms the upright wall 31 of the pipe holder portion toward the adjacent upright wall of the neighbor pipe holder portion, the thin connecting piece 43 strains on the basis of the adjacent upright wall 31 of the neighbor pipe holder portion and thereby the upright wall 31 having the pipe applied with the pulling-out force is not deformed. This allows the fastening force of the pipe to be maintained in high levels.

Each of the thin connecting pieces 43 is also formed with a slit 45 (see FIG. 4) extending in the longitudinal direction of the pipe. The slit 45 is formed at the center of the thin connecting piece 43 based on the longitudinal direction of the pipe, and each of the thin connecting pieces 43 connects the pipe holder portions 23–26 and the upright portions 29 at the opposite ends of the slit 45. By forming this slit, the lateral vibration transmission between respective pipe holder portions is further reduced, and the lateral vibration transmission between the upright portions 29 of the base 22 and the pipe holder portions 23–26 is further reduced. The size of the slit 45 can be formed to allow the straining force of the thin connecting piece 43 to be maintained.

An engagement leg 46 having a conventional anchor-type resilient engagement pawl is provided at the center of the lower surface in the longitudinal direction of the bottom portion 28 of the base 22. The fastener 21 can be attached to an automobile body or the like by inserting the engagement leg 46 into a mounting hole of the automobile body, a bracket fixed to an automobile body or the like.

FIGS. 5 and 6 show the state when pipes 36–39 are held by the fastener 21. Generally speaking, where a fuel pipe, brake oil pipe, or a pipe such as a wire harness is attached to an automobile, the fastener 21 is practicality delivered to a manufacturer of the fuel pipe, the wire harness or the like. Then, the fastener 21 is attached in a plurality of predetermined positions to hold a plurality of pipes under a predetermined schematic design. Thereafter, a plurality of pipes such as a fuel pipe or wire harness, to which the plurality of fasteners are attached under the predetermined design, are delivered to an automobile manufacturer, and are attached to predetermined positions of an automobile body by using the fastener 21 or the like. Thus, the state when the pipes 36–39 are held by the fastener 21 as shown in FIGS. 5 and 6 corresponds to the state when it is carried to the automobile manufacturer. For example, if the pipes are carried in the above state, a force acting to pull the pipes 36–39 out of the fastener 21 can be applied. In the conventional fastener 1, the pipe 15 can come off as explained with reference to FIG. 2. However, in the fastener 21 according to the present invention, even if a force acting to pull the pipes 36–39 out of the fastener 21 is applied, the pipes do not come off. This reason will be described with reference to FIGS. 7 and 8.

FIG. 7 shows the state when a pulling-out force is applied to one pipe 36 in the direction of the arrow Y. In this case, the pulling-out force Y of the pipe 36 applies a force Y1 to the pair of resilient holding fingers 34, and applies a force Y2 to the pair of thin connecting pieces 43. The thin connecting pieces 43 are thin, but not deformed. Thus, the left-side thin connecting piece 43 applies the force Y2 to the upright portion 29 of the base. The upright portion 29 receives this force without its deformation because of its high rigidity. In this state, while the force Y2 itself and a reaction force Y2 from the upright portion 29 act on the thin connecting piece 43, the thin connecting piece 43 is not deformed because of its anti-bendability and strains and resistively strains against these forces. Thus, the left-side resilient holding finger 34 is maintained in a posture for engaging the pipe 36 even if the force Y1 acts thereon. On the other hand, the right-side thin connecting piece 43 connected to the upright wall 31 of the neighbor pipe holder portion 24 applies the force Y2 as a force Y3 to the resilient holding finger 34. While this force acts on the pipe 37 held by the pipe holder portion 24, the pipe 37 receives the force without its deformation because of its high rigidity. The force Y2 itself and a reaction force from the pipe 37 and the resilient holding finger 34 act on the thin connecting piece 43. However, the thin connecting piece 43 resistively strains so as not to be deformed. Thus, the right-side resilient holding finger 34 is also maintained in a posture for engaging the pipe 36 even if the force Y1 caused by the pulling-out force Y acts thereon. In this manner, even if the pulling-out force is applied to one pipe, the inlet of the pipe holder portion is not opened, and thereby the pipe does not come off.

FIG. 8 shows the state when a pulling-out force is applied to the two adjacent pipes 36 and 37 in the direction of the arrows Ya and Yb. In this case, the pulling-out force Ya of one pipe 36 applies a force Ya1 to the pair of resilient holding fingers 34 and applies a force Ya2 to the pair of thin connecting pieces 43. As described in FIG. 7, the upright portion 29 receives the force without its deformation because of its high rigidity, and the force Y2 itself and the reaction force from the upright portion 29 each having the same magnitude act on the thin connecting piece 43. However, the thin connecting piece 43 resistively strains these forces without its deformation. Thus, even if the force Y1 is applied to the left side resilient holding finger 34, the left side resilient holding finger 34 is maintained in a posture for engaging the pipe 36. On the other hand, the force Ya2 is applied to the right-side thin connecting piece 43 connected to the upright wall 31 of the neighbor pipe holder portion 24. The pulling-out force Yb of the other pipe 37 applies a force Yb1 to the pair of resilient holding fingers 34, and applies a force Yb2 to the pair of thin connecting pieces 43. Thus, the force Ya2 from the right-side resilient holding finger 34 of the pipe holder portion 23 and the force Yb2 from the left-side resilient holding finger 34 of the pipe holder portion 24 act on the thin connecting piece 43 connected between the pipe holder portions 23 and 24. However, the thin connecting piece 43 resists so as not to be deformed. Thus, the right-side resilient holding finger 34 of the pipe holder portion 23 and the left side resilient holding finger 34 of the pipe holder portion 24 are maintained in each posture for engaging the pipes 36 and 37. Further, the force Yb1 of the right-side resilient holding finger 34 of the pipe holder portion 24 applies the force Yb2 to the thin connecting piece 43 on the right side of the right-side resilient holding finger 34. However, even if the force Yb1 caused by the pulling-out force Yb is applied to the right-side resilient holding finger 34, for the same reason as that in the right-side thin connecting piece 43 of the pipe holder portion 23 in FIG. 7, the right-side resilient holding finger 34 is maintained in a posture for engaging the pipes 37. In this manner, even if a pulling-out force is applied to the two adjacent pipes, each inlet of the pipe holder portions are not be opened, and the pipe does not come out.

FIG. 9 shows an example of attaching the fastener 21 to an automobile body 47. The fastener 21 is attached to a mounting bracket 49 by inserting an engagement leg 46 into a hole formed in the mounting bracket 49. The one end of the mounting bracket 49 is attached to an automobile body 47 with a bolt 51 and a nut 53 through an elastic bush 50, and thereby the pipes 36–39 are held by the automobile body 47. Thus, no vibration is transmitted from the pipes to the automobile body 47, and no vibration is transmitted from the automobile body 47 to the pipes 36–39. Further, even if a pulling-out force is applied to an attached pipe, the pipes do not come off, and a high fastening force is maintained.

FIG. 10 shows another embodiment according to the present invention. Elements or components corresponding to the aforementioned embodiment are represented by the same reference numerals, and their detailed description will be omitted. In this embodiment, individual structures of pipe holder portions 23–26 are the same as those in the embodiment shown in FIGS. 3 and 4. The pipe holder portions 23–26 are supported to the base 22 through the hollow tubular cushion portion 41. The pipe holder portions 23–26 are connected with each other through the sheet-like thin connecting pieces 43, and the pipe holder portion 23 is connected to the upright portion 29 of the base 22 through the thin connecting piece 43. The slit 45 shown in FIG. 4 is formed in each of the thin connecting pieces 43.

Instead of the wall-shaped upright portion, a stud-mounting portion 54 is formed to extend vertically upward at one of the opposite ends of the elongated bottom portion 28 of the base 22. The stud-mounting portion 54 has a rectangular block-like shape and includes a through hole 55 in the longitudinal direction therewithin. Two pairs of engagement pawls 57 and 58 extending into the through hole 55 are formed in the stud-mounting portion 54. An automobile body 47 is provided with a stud 59 standing thereon. When the fastener 21 is pressed to the automobile body 47 to allow the stud 59 to be received in the through hole 55 of the stud-mounting portion 54, the two paired engagement pawls 57 and 58 are engaged with the threads of the stud. Thus, the fastener 21 is fixed to the automobile body 47, and the pipes 36–39 are held by the automobile body 47. In this case, no vibration is also transmitted from the pipes to the automobile body, no vibration is transmitted from the automobile body to the pipes. Further, even if a pulling-out force is applied to an attached pipe, the pipes do not come off and a high fastening force is maintained.

According to the present invention, the pipe holder portion is connected to the base through both the tubular cushion portion and the thin connection piece, so that vibration insulation characteristics between the pipe holder portion and the base can be maintained in high levels. Further, the end of the wall is connected to the adjacent wall (or the wall of the base) through the short sheet-like thin connecting piece, whereby, even if a pushing-out force is applied to a held pipe and thereby the wall is urged to deform in the direction allowing the inlet to be opened, the thin connecting piece strains to resist the deformation. This prevents the wall from being deformed and allows the fastening force of the pipe to be maintained in high levels.

I claim:

1. A fastener for an elongated pipe component, comprising a base and a pipe holder portion supported by said base, wherein said pipe holder portion includes a wall defining a recess for receiving the elongated pipe component therein, and a resilient holding finger extending obliquely from an end of said wall or the vicinity thereof into said recess, and said pipe holder portion is supportedly connected to said base through a hollow tubular cushion portion, characterized in that the end of said wall of said pipe holder portion is connected by a thin connecting piece, to either a spaced apart adjacent wall of another pipe holder portion or a spaced apart adjacent wall which is integrated with said base, further wherein said thin connecting piece is formed of a thin plate having the same length as that of said pipe holder portion in a longitudinal direction of the elongated pipe component to be attached to said recess, wherein said thin connecting piece is formed with a slit extending a portion of the longitudinal length of the connecting piece and extending in the longitudinal direction of the elongated pipe component.

2. A fastener as defined in claim 1, wherein said base is formed with an attaching portion to be attached to an anchor member which is fixed to an attachment member.

3. A fastener for elongated pipe components, comprising:
    a base including an elongated bottom portion and upright portions extending perpendicularly from opposite ends of said bottom portion; and
    a plurality of pipe holder portions supported by said base to be arranged adjacent one another with a certain distance therebetween In the longitudinal direction of said base, each of said pipe holder portions including a wall defining a recess for receiving the elongated pipe component therein, and a resilient holding finger extending obliquely from an end of said wall or the vicinity thereof into said recess, and each of said pipe holder portions is supportedly connected to said base through a hollow tubular cushion portion,
    wherein in the pipe holder portion adjacent to said upright portion of said base among said pipe holder portions, the end of said wail adjacent to said upright portion is connected to said upright portion by a first thin connecting piece, and the opposite end of said wail is connected to the end of the wall of a spaced apart adjacent pipe holder portion by a second thin connecting piece,
    further wherein said first and second thin connecting pieces are formed having the same length as that of said pipe holder portion in the longitudinal direction of the elongated pipe component to be attached to said recess, wherein said thin connecting pieces define a slit extending a portion of the longitudinal length of the connection piece and extending in the longitudinal direction of the elongated pipe component.

4. A fastener as defined in claim 3, wherein said bottom portion of said base further comprises a coupling leg to be coupled with an attachment member.

5. A fastener as defined in claim 3, wherein said base is formed with an attaching portion to be attached to an anchor member which is fixed to an attachment member.

6. A fastener for an elongated pipe member, comprising:
    a base;
    a pipe holder portion supported by said base, said pipe holder portion comprising a wall defining a recess for receiving the elongated pipe member therein;
    a resilient holding finger, said holding finger extending obliquely from an end of said wall into said recess;
    a hollow tubular cushion portion connecting said pipe holder portion to said base; and
    at least one thin connecting piece configured to connect said pipe holder portion to one of a spaced apart adjacent wall of another pipe holder portion or a spaced apart adjacent wall integrated with said base,
    wherein said thin connecting piece comprises a thin plate having the same length as that of said pipe holder portion in a longitudinal direction of the elongated pipe member, further wherein said thin connecting piece defining a slit extending a portion of the longitudinal length of the connecting extending in the longitudinal direction of the elongated pipe member.

7. A fastener as defined in claim 6, wherein said base comprises an attaching portion to be attached to an anchor member, said anchor member fixed to an attachment member.

8. A fastener as defined in claim 7, wherein said anchor member comprises a stud.

9. A fastener as defined in claim 7, wherein said attachment member is an automobile body.

10. A fastener as defined in claim 6, wherein said wall further comprises at least one inward holding-protrusion.

11. A fastener as defined in claim 6, further comprising a support post connecting said cushion portion to said base.

12. A fastener as defined in claim 6, further comprising a plurality of pipe holder portions supported by said base, said plurality of pipe holder portions disposed adjacent one another with a predefined distance therebetween in the longitudinal direction of said base, each said pipe holder portions including a wall defining a recess for receiving an elongated pipe member therein, wherein adjacent walls are joined to one another by a thin connecting piece having a slit extending in the longitudinal direction of the elongated pipe member.

13. A fastener as defined in claim 12, wherein said pipe holding portions further comprise a resilient holding finger extending obliquely from an end of said wall or the vicinity thereof into said recess.

14. A fastener as defined in claim 12, wherein said pipe holder portions are supportably connected to said base through hollow tubular cushion portions.

* * * * *

UNITED STATES PATENT AND TRADEMARK OFFICE
CERTIFICATE OF CORRECTION

| | | |
|---|---|---|
| PATENT NO. | : 7,036,775 B2 | Page 1 of 1 |
| APPLICATION NO. | : 10/467972 | |
| DATED | : May 2, 2006 | |
| INVENTOR(S) | : Hideaki Nakanishi | |

It is certified that error appears in the above-identified patent and that said Letters Patent is hereby corrected as shown below:

Title Page,
Item [57] ABSTRACT, delete lines 1 through 16 and insert the following:

-- A fastener for a pipe member comprising a base and a pipe holder portion supported by the base. The pipe holder portion includes a wall defining a recess for receiving the pipe member therein. A resilient holding finger extends obliquely from the vicinity of the wall into the recess. The pipe holder portion is supportably connected to the base by a hollow tubular cushion portion. An end of the wall of the pipe holder portion is connected by a short, thin connecting piece, to either an adjacent wall of another pipe holder or an adjacent wall integrated with the base. The thin connecting piece comprises a thin plate having the same length as that of the pipe holder in the longitudinal direction of the pipe. The thin connecting piece is formed with a slit extending in the longitudinal direction of the pipe. --.

Column 8,
Line 13, "In" should be -- in --.
Line 23, "wail" should be -- wall --.
Line 25, "wail" should be -- wall --.
Line 34-35, "connection" should be -- connecting --.
Line 61, "defining" should be -- defines --.
Lines 62, after "connecting" insert -- piece and --.

Signed and Sealed this

Ninth Day of January, 2007

JON W. DUDAS
*Director of the United States Patent and Trademark Office*